(12) United States Patent
Rodriguez et al.

(10) Patent No.: US 10,708,546 B2
(45) Date of Patent: *Jul. 7, 2020

(54) MULTIPOSITION MAGNIFIER CAMERA

(71) Applicant: Freedom Scientific, Inc., St. Petersburg, FL (US)

(72) Inventors: Carlos M. Rodriguez, Palm Harbor, FL (US); Patrick Murphy, Lithia, FL (US); Waldemar H. Tunkis, Palm Harbor, FL (US); Todd Conrad, Ruskin, FL (US); Michael Goldenberg, Melbourne, FL (US); Lee Hamilton, Tampa, FL (US); Bradley S. Davis, Treasure Island, FL (US); Robert Leon, Miami, FL (US)

(73) Assignee: Freedom Scientific, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,018

(22) Filed: Jun. 4, 2018

(65) Prior Publication Data

US 2018/0288370 A1    Oct. 4, 2018

Related U.S. Application Data

(63) Continuation of application No. 13/734,672, filed on Jan. 4, 2013, now Pat. No. 9,992,453.

(60) Provisional application No. 61/673,930, filed on Jul. 20, 2012.

(51) Int. Cl.
    *H04N 7/18*     (2006.01)
    *G03B 17/04*    (2006.01)
    (Continued)

(52) U.S. Cl.
    CPC ........... *H04N 7/18* (2013.01); *G03B 17/04* (2013.01); *G03B 17/12* (2013.01); *H04N 5/2252* (2013.01); *G03B 17/55* (2013.01)

(58) Field of Classification Search
    CPC .. H04N 5/2252; H04N 1/195; H04N 1/19594; H04N 2201/043;
    (Continued)

(56) References Cited

U.S. PATENT DOCUMENTS

3,816,646 A   6/1974  Cinque
4,392,732 A   7/1983  Pizzuti
(Continued)

FOREIGN PATENT DOCUMENTS

EP   1921838 A2   5/2008
JP   3026273 U    7/1996
(Continued)

*Primary Examiner* — Dave Czekaj
*Assistant Examiner* — Samuel D Fereja
(74) *Attorney, Agent, or Firm* — GrayRobinson, P.A.; Michael J. Colitz, III

(57) ABSTRACT

A portable magnifier camera with an associated display housing, base and handle. The camera can be selectively positioned into a variety of configurations, including: a first closed configuration wherein the display and base are in facing relation; a second opened configuration wherein the display is angled with respect to the base; and a third hand-held configuration wherein a handle is pivoted outwardly to permit a user to hold the camera relative to a distant object. The angle of the camera adjusts automatically in each configuration to ensure that the camera's light of slight is perpendicular to the object plane. These configurations enable a user to effectively view objects of differing size and at varying distances.

10 Claims, 14 Drawing Sheets

(51) Int. Cl.
*G03B 17/12* (2006.01)
*H04N 5/225* (2006.01)
*G03B 17/55* (2006.01)

(58) Field of Classification Search
CPC ..... H04N 2201/0436; H04N 2201/045; H04N 5/2256; H04N 5/2254; H04N 7/142; H04N 2007/145; H04N 1/00129; H04N 2101/00; H04N 5/2251; H04N 5/23293; H04N 7/18; H04N 2201/0081; H04N 2201/0089; H04N 5/247; H04N 1/00347; H04N 1/00535; H04N 2201/0096; H04N 5/2257; H04N 5/23229; H04N 5/235; H04N 5/2355; H04N 7/0132; H04N 7/0135; H04N 7/144; H04N 7/183; H04M 1/0216; H04M 1/0264; H04M 1/0214; H04M 1/0237; H04M 1/0247; H04M 2250/52; H04M 1/0218; H04M 1/233; H04M 1/236; H04M 2250/16; H04M 1/0212; G06F 1/1616; G06F 1/1686; G06F 1/1624; G06F 1/1641; G06F 1/1647; G06F 1/1679; G06F 1/1683; G06F 1/1607; G06F 1/1622; G06F 1/1626; G06F 1/169; G06F 1/1601; G06F 1/162; G06F 1/1667; G06F 1/1681; G06F 2203/04806; G06F 3/0481

See application file for complete search history.

(56) References Cited

U.S. PATENT DOCUMENTS

| | | | |
|---|---|---|---|
| 7,359,003 | B1 | 4/2008 | Knighton et al. |
| 8,896,741 | B2 | 11/2014 | Akagi et al. |
| 9,213,220 | B2 | 12/2015 | Fowler et al. |
| 2001/0043166 | A1 | 11/2001 | Jacobsen et al. |
| 2001/0045939 | A1 | 11/2001 | Myerson et al. |
| 2002/0016191 | A1 | 2/2002 | Ijas et al. |
| 2004/0174452 | A1* | 9/2004 | Kinemura .......... H04N 5/2252 348/333.06 |
| 2004/0246340 | A1 | 12/2004 | Sukenari et al. |
| 2005/0168627 | A1 | 8/2005 | Yi et al. |
| 2005/0243073 | A1 | 11/2005 | Hashimoto et al. |
| 2005/0253959 | A1 | 11/2005 | Nakamura |
| 2006/0121940 | A1 | 6/2006 | Kong et al. |
| 2006/0203093 | A1 | 9/2006 | Trulaske |
| 2007/0296845 | A1 | 12/2007 | Watanabe et al. |
| 2009/0002548 | A1 | 1/2009 | Liang et al. |
| 2009/0059038 | A1 | 3/2009 | Seakins et al. |
| 2009/0093274 | A1 | 4/2009 | Yamamoto |
| 2009/0244363 | A1 | 10/2009 | Sugimura et al. |
| 2010/0026855 | A1* | 2/2010 | Conard ................ H04N 1/195 348/240.99 |
| 2010/0208123 | A1 | 8/2010 | Akagi et al. |
| 2011/0074940 | A1* | 3/2011 | Goldenberg ........ G02B 27/026 348/63 |
| 2012/0062691 | A1 | 3/2012 | Fowler et al. |
| 2012/0113401 | A1 | 5/2012 | Yamazaki et al. |
| 2012/0314116 | A1 | 12/2012 | Jannard et al. |
| 2014/0078389 | A1 | 3/2014 | Merz |
| 2014/0118799 | A1 | 5/2014 | Van Der Snoek |

FOREIGN PATENT DOCUMENTS

| | | |
|---|---|---|
| JP | 2004336229 A | 11/2004 |
| JP | 2005326514 A | 11/2005 |
| JP | 2006025087 A | 1/2006 |
| JP | 2009246884 A | 10/2009 |
| JP | 2011530262 A | 12/2011 |
| WO | 2010017121 A3 | 4/2010 |

* cited by examiner

MULTIPOSITION MAGNIFIER CAMERA

CROSS-REFERENCE TO RELATED APPLICATIONS

This application is a continuation of U.S. application Ser. No. 13/734,672, filed Jan. 4, 2013 and entitled "Multiposition Magnifier Camera," now U.S. Pat. No. 9,992,453, issued Jun. 5, 2018, which itself claims priority to provisional application Ser. No. 61/673,930 filed on Jul. 20, 2012 and entitled "Multiposition Magnifier Camera," the contents of which are fully incorporated herein for all purposes.

TECHNICAL FIELD

This invention relates to a magnification device for individuals with low vision. More particularly, the present invention relates to a portable magnification device that has a variety of discrete configurations.

BACKGROUND OF THE INVENTION

The use of portable magnifiers for low vision users is known in the art. To date, however, these magnifiers have been heavy, bulky, and cumbersome to use. Additionally, many of these magnifiers have only one mode of operation, a mode that requires the user to hold the device at a fixed distance above the object being viewed.

Additionally, many magnifiers that are designed to be placed upon the object to be viewed typically leave little or no room over top of the object. This prohibits the user from interacting with the object being viewed. For instance, if the object is a document, a user cannot write upon the document while it is being magnified.

What is needed, then, is a magnifier with multiple configurations and modes of operation, whereby a user can use the magnifier by either holding the device over the object or by placing the device upon the object. There is an additional need for a magnifier that allows users to interact with the object while it is being magnified. There is also a need in the art for a portable magnifier that has a compact closed orientation for the storage and transport of the device. The portable multi position magnifier camera of the present invention is directed at fulfilling these needs.

SUMMARY OF THE INVENTION

One advantage of the present camera is it allows a user to configure the camera into one of a variety of viewing modes so that viewing of different sized objects at varying distances may be optimized.

The camera of the present disclosure also has the advantage that it can either be held over an object to be viewed or hand held.

It is a further advantage is that the camera can be positioned upon an object to be viewed, while at the same time providing a clearance space to permit the user to interact with the object.

A further advantage is realized by providing a camera that automatically adjusts as adjustments are made to the viewing angle of a camera display so that the camera axis remains perpendicular to the image plane.

A further advantage is realized by providing lighting that automatically pivots during adjustments to the device so that the image being viewed always well lit with direct lighting.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference characters refer to similar parts throughout the several views of the drawings.

| Parts List | | |
|---|---|---|
| 10 Magnifier Device | 30 Base | 40 Handle |
| 20 Display Housing | 310 Lower Lever Arm | 410 Handle Top |
| 210 LCD Screen | 312 Opposing Feet of Base | 412 Handle Bottom |
| 212 Control Keys | | 414 Battery Pack |
| 214 Camera and Lighting Housing | 314 Space between Feet of Base | 416 Hinge |
| 216 Openings for Lights | 315 Openings in Feet for Lights | 418 Bushing Detent |
| | | 418a Lugs |
| 218 Camera and Lighting Assembly | 316 Recess for Handle Lugs | 418b Apertures for Lugs |
| 220 Camera | 318 Thumb Paddles | 422 Detent Apertures |
| 222 Camera Slug | 320 Hinge Knuckle | 424 Ring Spring |
| 224 Pivot Points | 322 Hinge for Display Housing | 426 Top Bushing |
| 226 Lights | | 428 Washer |
| 228 Upper Lever Arm | | 432 Retaining Rings |
| 232 Axle on Upper Lever Arm | | 434 Plunger |
| | | 436 Plunger Spring |
| 234 Torsion Spring for Axle | | 438 Retainer |
| | | 442 Thumb Grip |
| 236 Bell Crank on Axle | | |

| Parts List |
| --- |
| 238 Bell Crank on Camera and Lighting Assembly |
| 242 S-Link between Opposing Bell Cranks |
| 244 Raceway for Wiring |

DETAILED DESCRIPTION OF THE DRAWINGS

The present invention relates to portable magnifier camera with an associated display housing, base and handle. The camera can be selectively positioned into a variety of configurations, including: a first closed configuration wherein the display and base are in facing relation; a second opened configuration wherein the display is angled with respect to the base; and a third hand-held configuration wherein a handle is pivoted outwardly to permit a user to hold the camera relative to a distant object. The angle of the camera adjusts automatically in each configuration to ensure that the camera's light of slight is perpendicular to the object plane. These configurations enable a user to effectively view objects of differing size and at varying distances.

Figure 1:
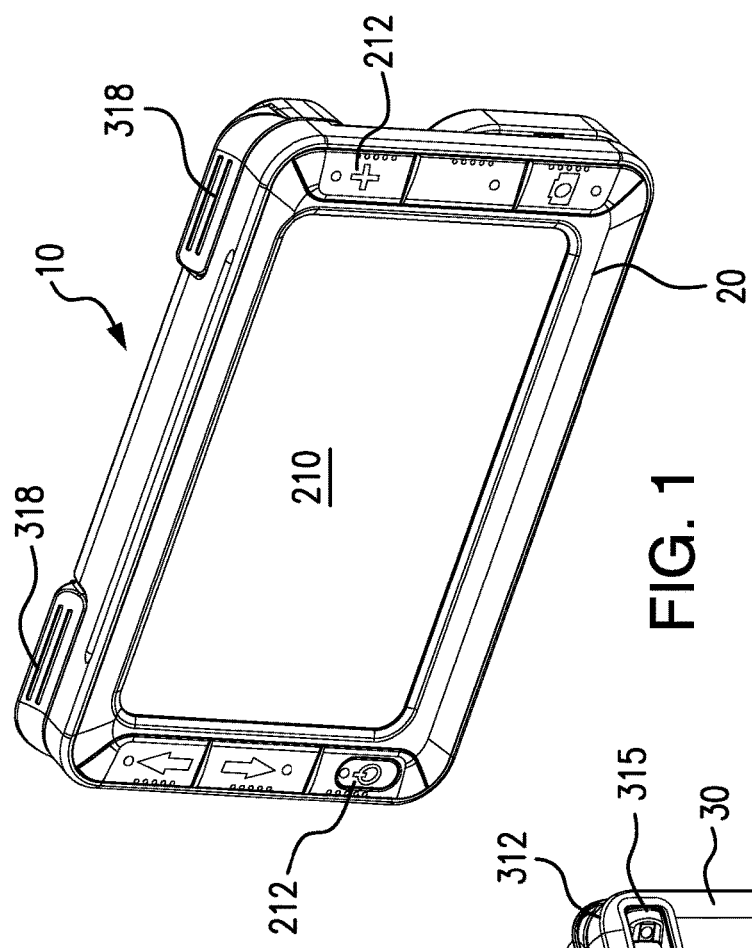
FIG. 1 is a perspective view of the front of the camera device.
Figure 2:
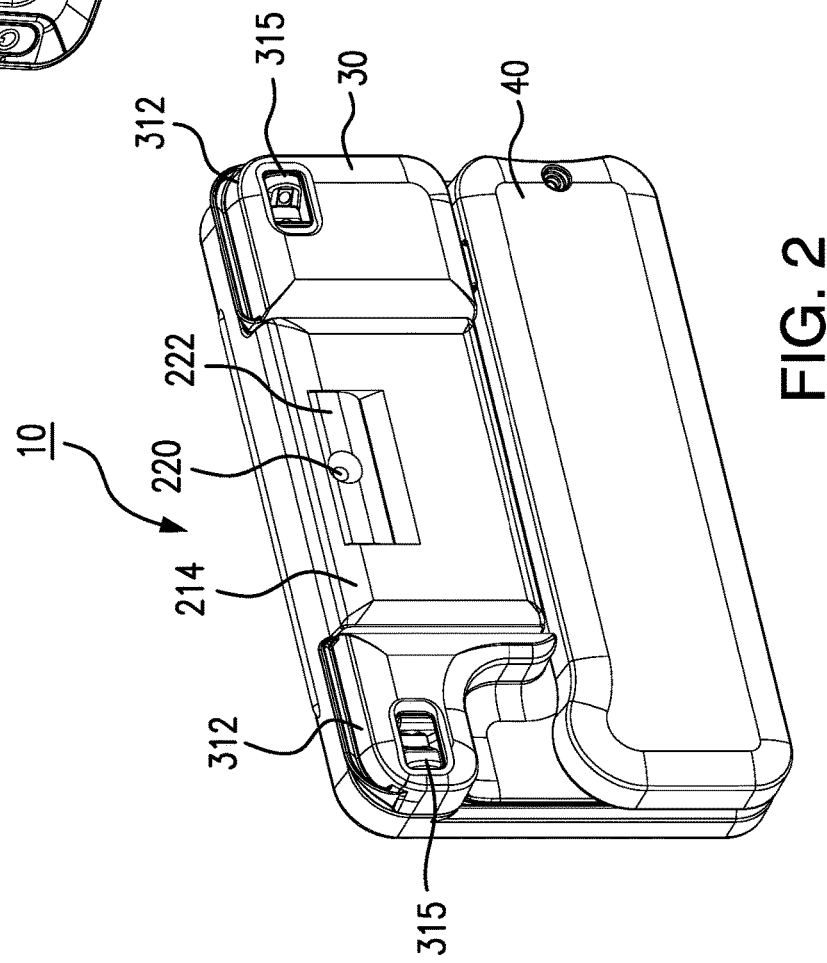
FIG. 2 is a perspective view of the back of the camera device.
Figure 3:
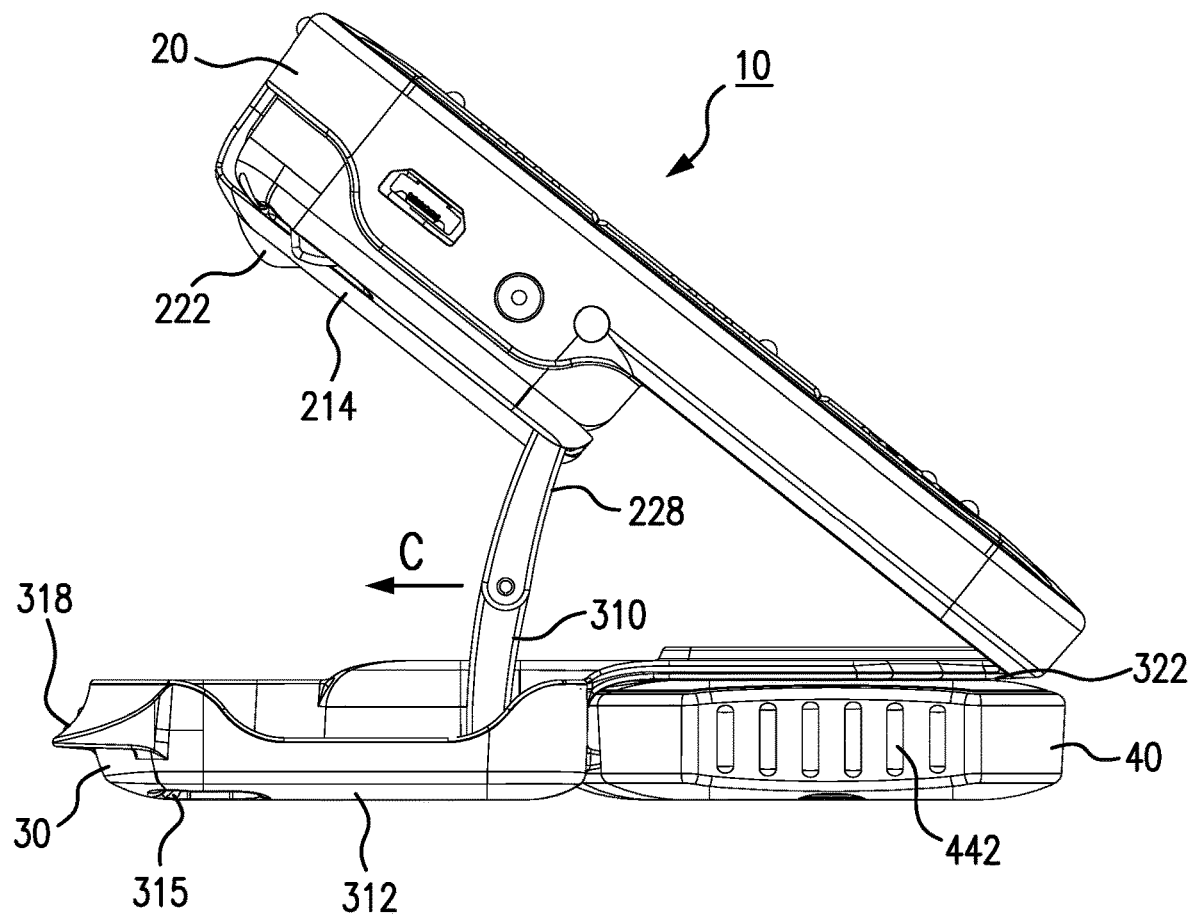
FIG. 3 is a side elevational view of the camera device in the opened orientation.
Figure 4:
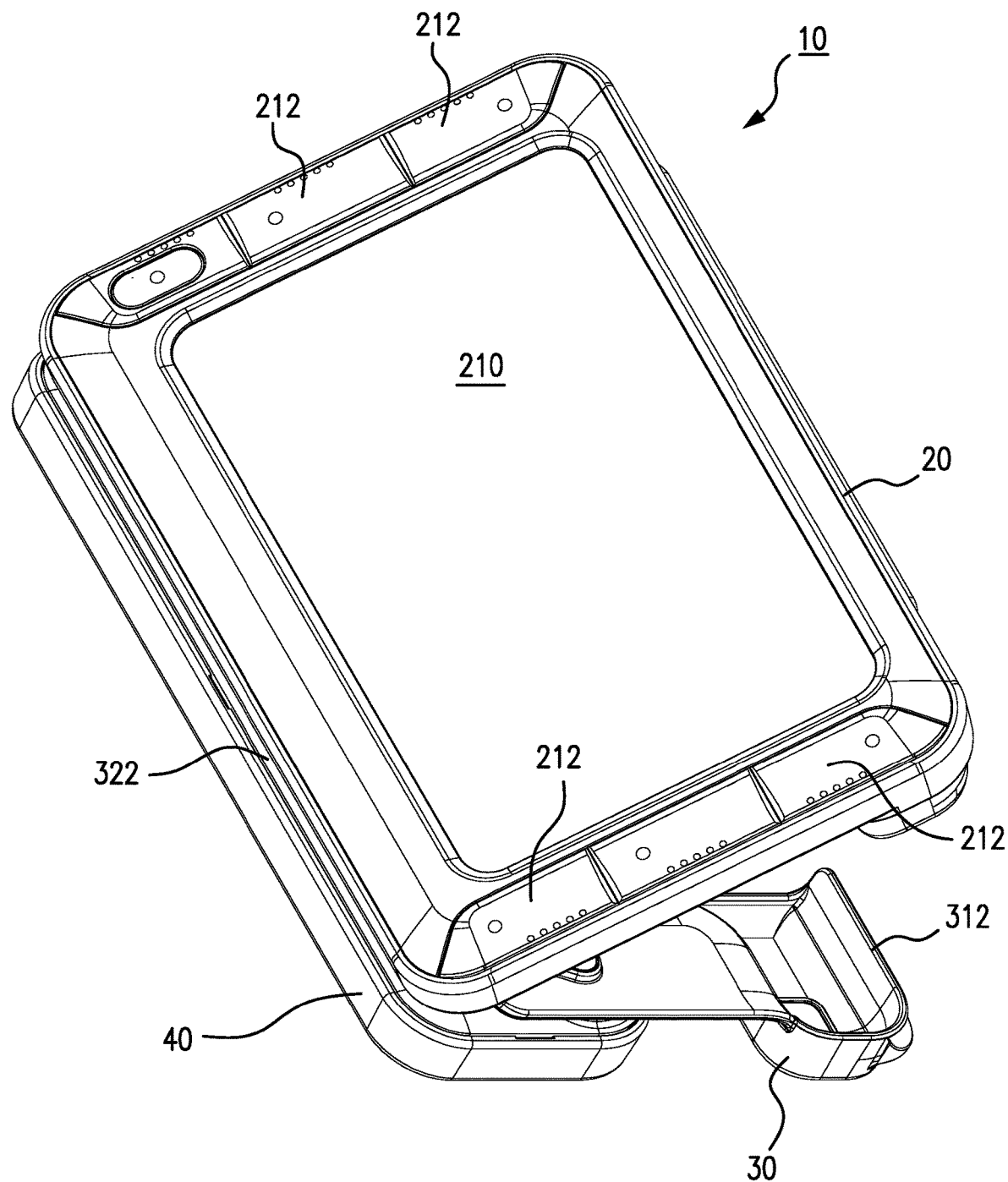
FIG. 4 is a perspective view of the camera device in the opened orientation.
Figure 5:
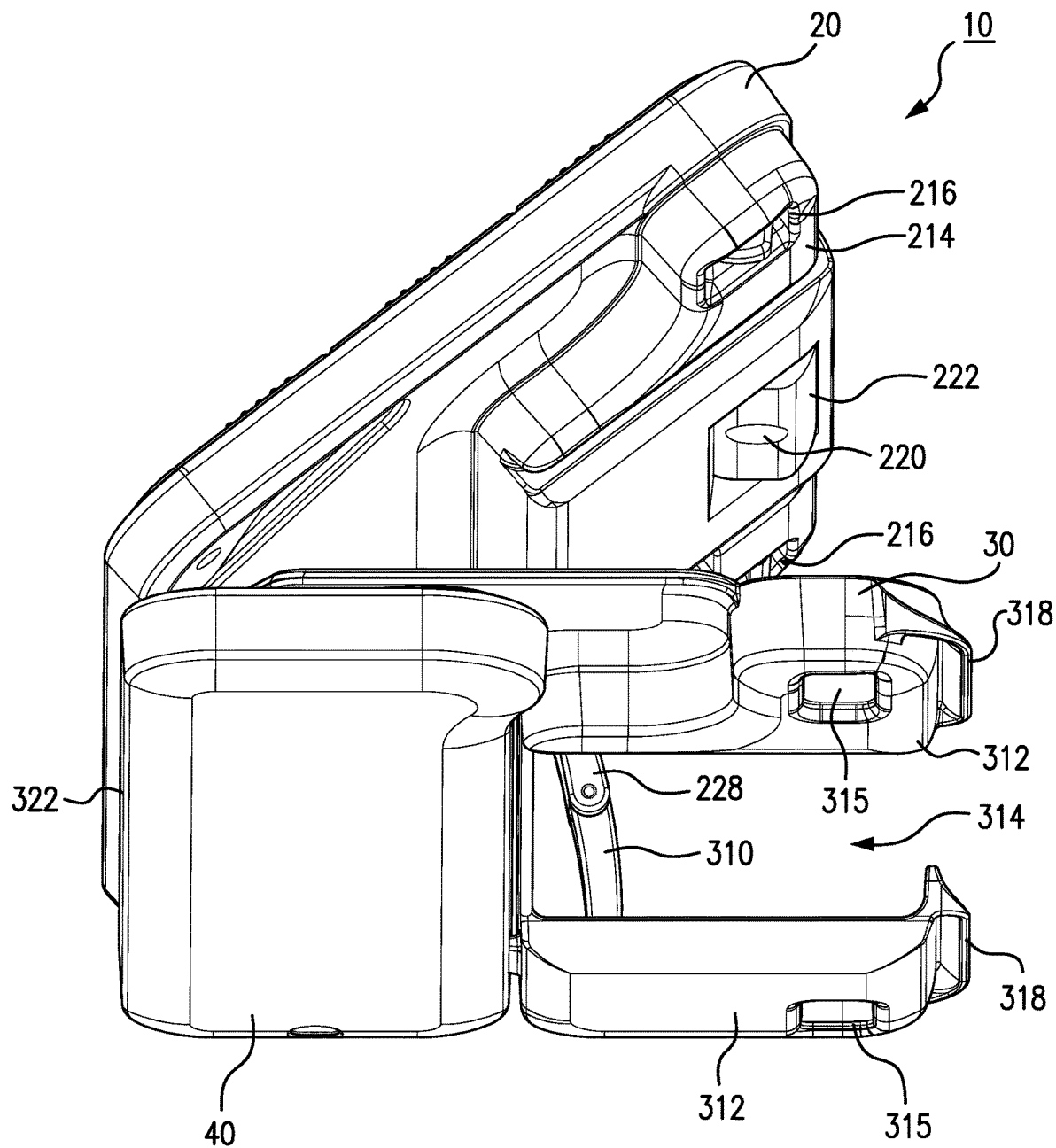
FIG. 5 is a perspective view of the camera device in the opened orientation.
Figure 6:
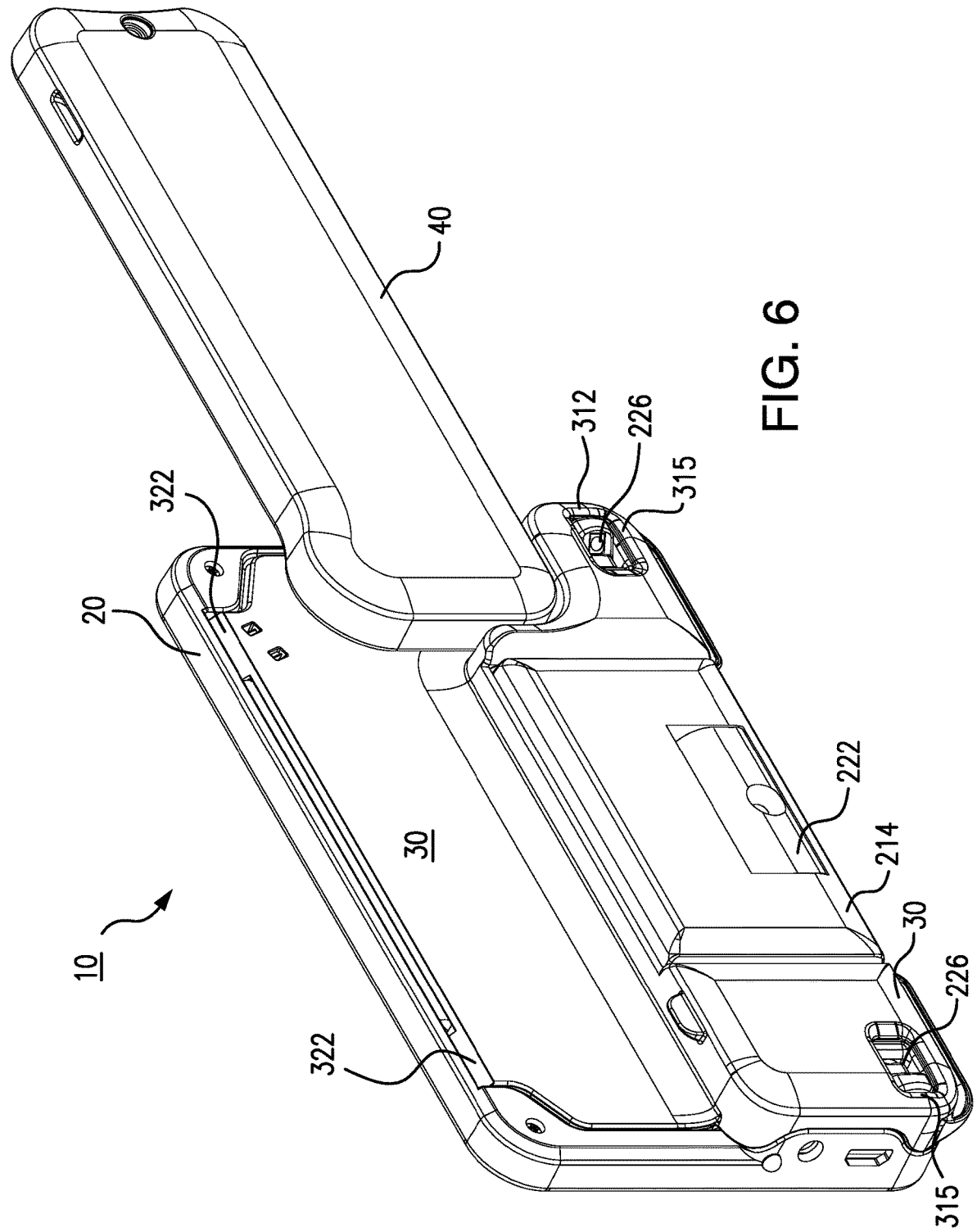
FIG. 6 is a view of the camera device with the handle rotated to the 180° position.
Figure 7:
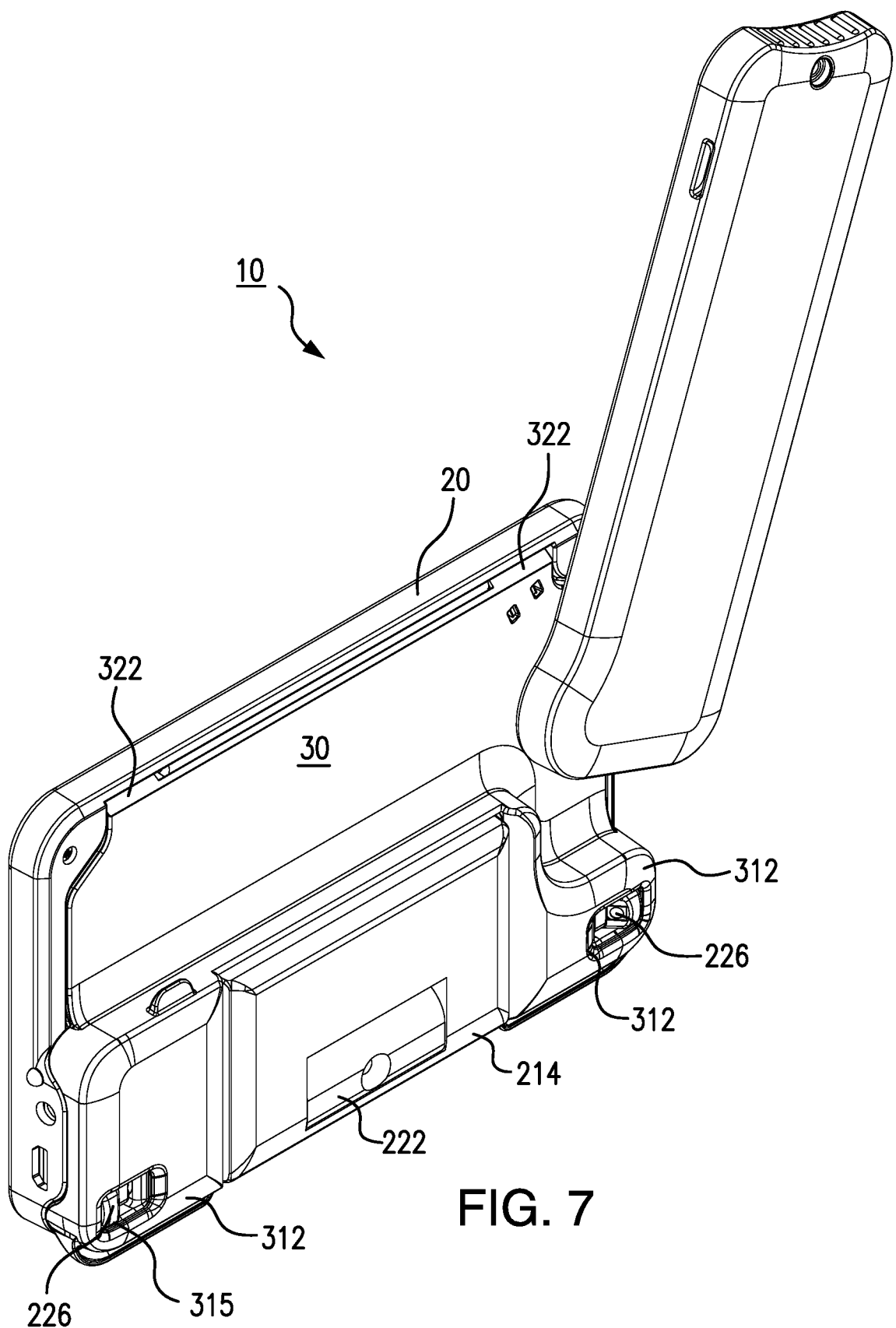
FIG. 7 is a view of the camera device with the handle rotated to the 110° position.

As noted in FIGS. 1-3, the magnifier device 10 includes an upper display housing 20 that is pivotally secured to a lower base 30. Display 20 and housing 30 are interconnected via a hinge 322 at the back of display 10. Housing 20 includes an LCD screen 210 and associated controls 212 on its upper surface. A pair of pivotal lever arms (228 and 310) also extend between the display housing 20 and base 30. The display housing 20 and base 30 have a first orientation wherein the device 10 is closed and the display housing 20 and base 30 are in facing relation. A magnetic closure can be used to keep the device 10 in the closed orientation. A second orientation is provided wherein the device 10 is opened and display housing 20 is pivoted at an angle with respect to the base 30. A handle 40 is also pivotally connected to the base 30. Handle 40 can be pivoted with respect to the housing 20, to permit device 10 to be held at a distance from an object to be viewed. Details regarding the display housing 20, lower base 30, and handle 40 are provided below.

Display Housing 20

Display housing 20 includes an outer screen 210 for displaying objects viewed by an associated camera 220. In the preferred embodiment, screen 210 is a liquid crystal display (LCD); however, other screen types can readily be employed. Screen 210 is preferably a full color video graphics array (VGA) display. The input to the LCD screen 210 comes from a field programmable gate array ("FPGA") that resides within display housing 20. In the preferred embodiment, low-voltage differential signaling (LVDS) is employed in interconnecting FPGA to LCD screen 210. This renders a purely digital output on screen 210 and also permits camera 220 to be used in conjunction with an external monitor (not shown). Camera 220 can store images on an internal memory for later viewing.

Control keys 212 are positioned at either side of screen 210 and can be used to operate screen 210 and/or camera 220. Control keys 212 can include a power button, camera button to operate camera, a zoom button to cycle through different magnification levels, and a mode control to cycle through different contrasting color combinations. A camera and lighting housing 214 forms part of the display housing 20. Housing 214 includes opposed openings 216 for lighting. A camera and lighting assembly 218 (note FIGS. 10A and 10B) is positioned within the housing 214. Camera 220 is centrally mounted along the lighting assembly 218. Camera 220 can be a conventional digital camera employing one or more CMOS (complementary metal-oxide semiconductor) or CCD (charge-coupled device) image sensors. In a preferred but non-limiting example, a 5 megapixel CMOS image sensor is used. The output of the image sensor can be provided to a field programmable gate array FPGA and to an image buffer.

Camera 220 is mounted within a camera slug 222. Camera slug 222 is preferably formed from aluminum, or an aluminum alloy, and operates as a heat sink to absorb and dissipate heat from the image sensors associated with camera 220. Other materials can also readily be used provided that they operate as a passive heat exchanger for the image sensors. A portion of slug 222 is preferably exposed to allow convection and the cooling of slug 222 via heat dissipation. Camera slug 222 includes a central camera aperture for viewing objects. Both the camera 220 and camera slug 222 are mounted to the assembly 218 via a flexible circuit. Camera 220 is rigidly fixed relative to assembly 218. Assembly 218, along with camera 220 and slug 222, pivot about opposing pivot points 224 at the opposite ends of assembly 218. This pivotal movement of assembly 218 thereby allows the angular orientation of camera 220 to be adjusted. Lights 226 are included at the outer extends of the assembly 218. Accordingly, lights 226 are pivotally adjusted along with assembly 218. Lights 226 are preferably light emitting diodes (LEDs). However, other light sources, such as cold cathode fluorescent lamps (CCFL), can also be used in conjunction with the invention.

Assembly 218 is automatically rotated as display housing 20 is pivoted between opened and closed orientations. This automatic rotation is accomplished via the camera and lighting positioning mechanism illustrated in FIGS. 8A, 8B, 9A, 9B, 10A, and 10B. Display housing 20 is pivoted relative to base by way of upper and lower lever arms (228 and 310). Upper lever arm 228 includes a distal end that is affixed to an axle 232. The proximal end of lever arm 228 is pivotally attached to the lower lever arm 310. Axle 232 and lever arm 228 rotate as display housing 20 pivots between the opened and closed orientations. Namely, the proximal end of lever arm 228 (i.e. the end opposite axle 232) rotates toward the rear of device 10 while display housing 20 is being opened. Conversely, the proximal end of lever arm 228 rotates toward the front of device 10 as display housing 20 is being closed. Arrow "C" in FIG. 3 shows the movement of intermediate pivot point of lever arms (228 and 310) as housing 20 is being closed.

A torsion spring 234 is positioned about axle 232 and urges the display housing 20 into the opened orientation relative to base 30. A bell crank 236 is also mounted upon axle 232. One end of torsion spring 234 is affixed to bell crank 236. A corresponding bell crank 238 is mounted upon assembly 218. An S-link 242 extends between and connects the opposing bell cranks 236 and 238. More specifically, S-link 242 has opposing ends that are inserted into apertures within the opposing bell cranks 236 and 238. Accordingly, rotational movement of axle 232 results in a corresponding rotational movement of assembly 218. S-link also functions as a spring to dampen the movement of assembly 218. The angular range of assembly 218 is limited by contact surfaces within the interior of display housing 20.

Figure 8A:
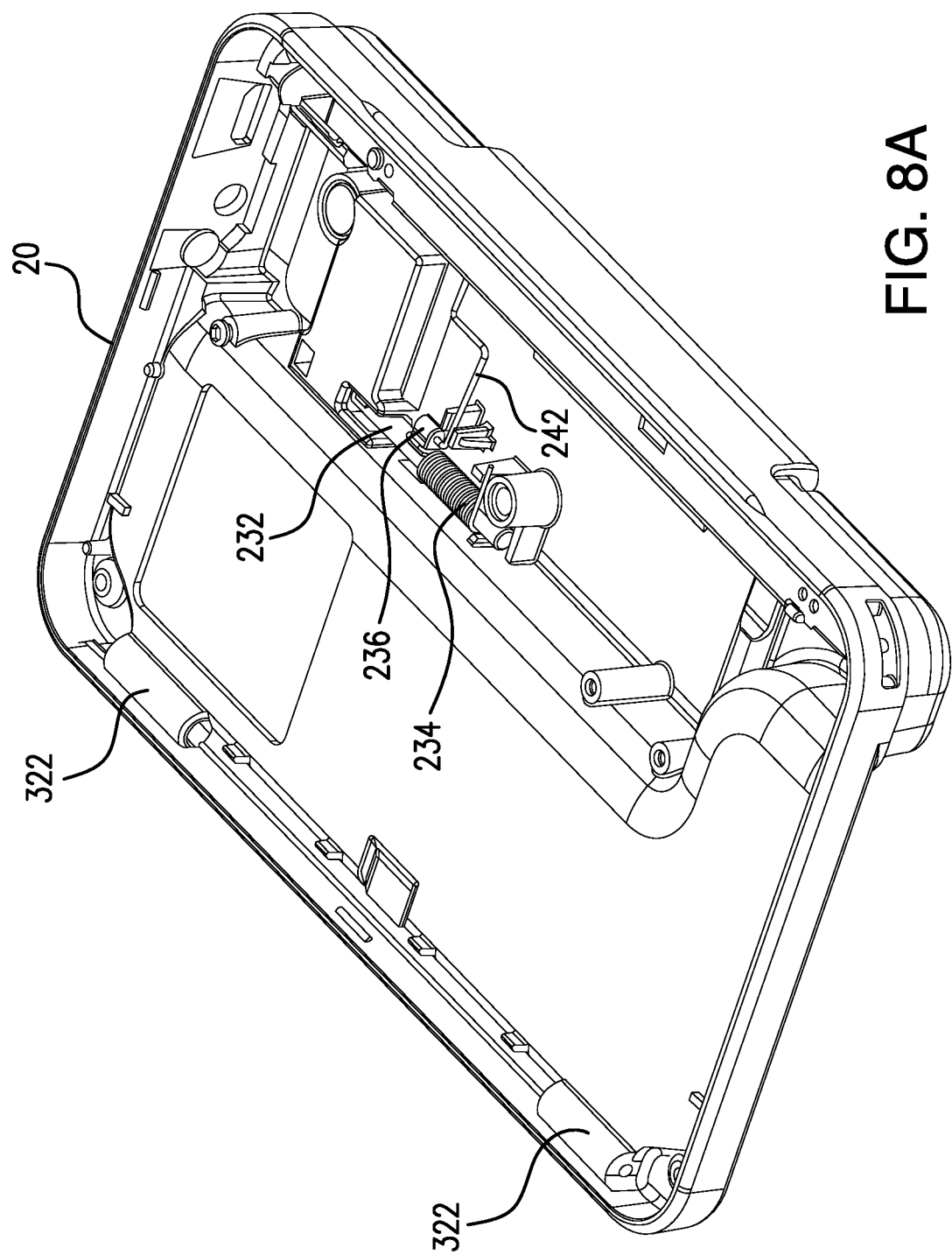
FIG. 8A is a view of the interior of the display housing with the camera device in the closed orientation.
Figure 8B:
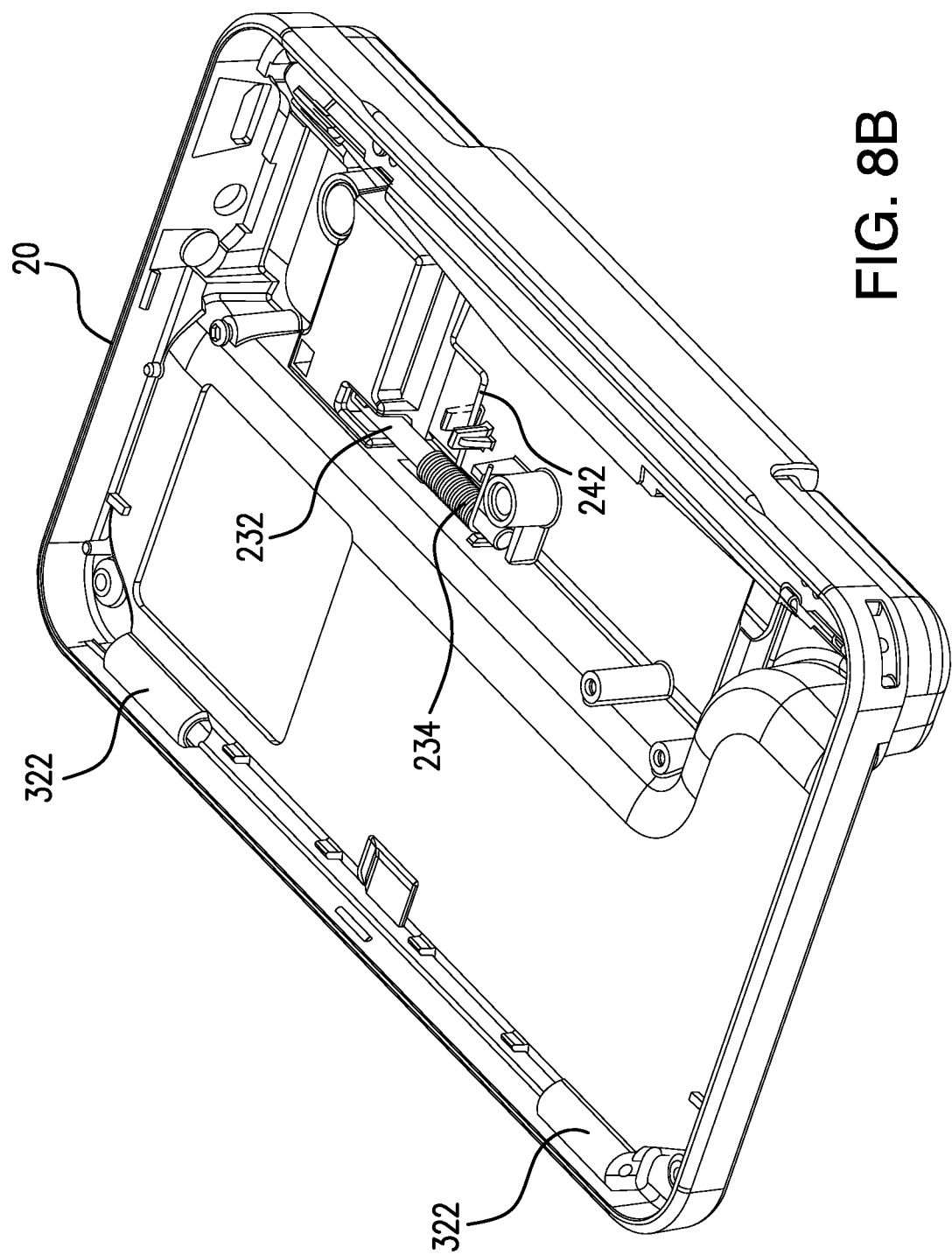
FIG. 8B is a view of the interior of the display housing with the camera device in the opened orientation.
Figure 9A:
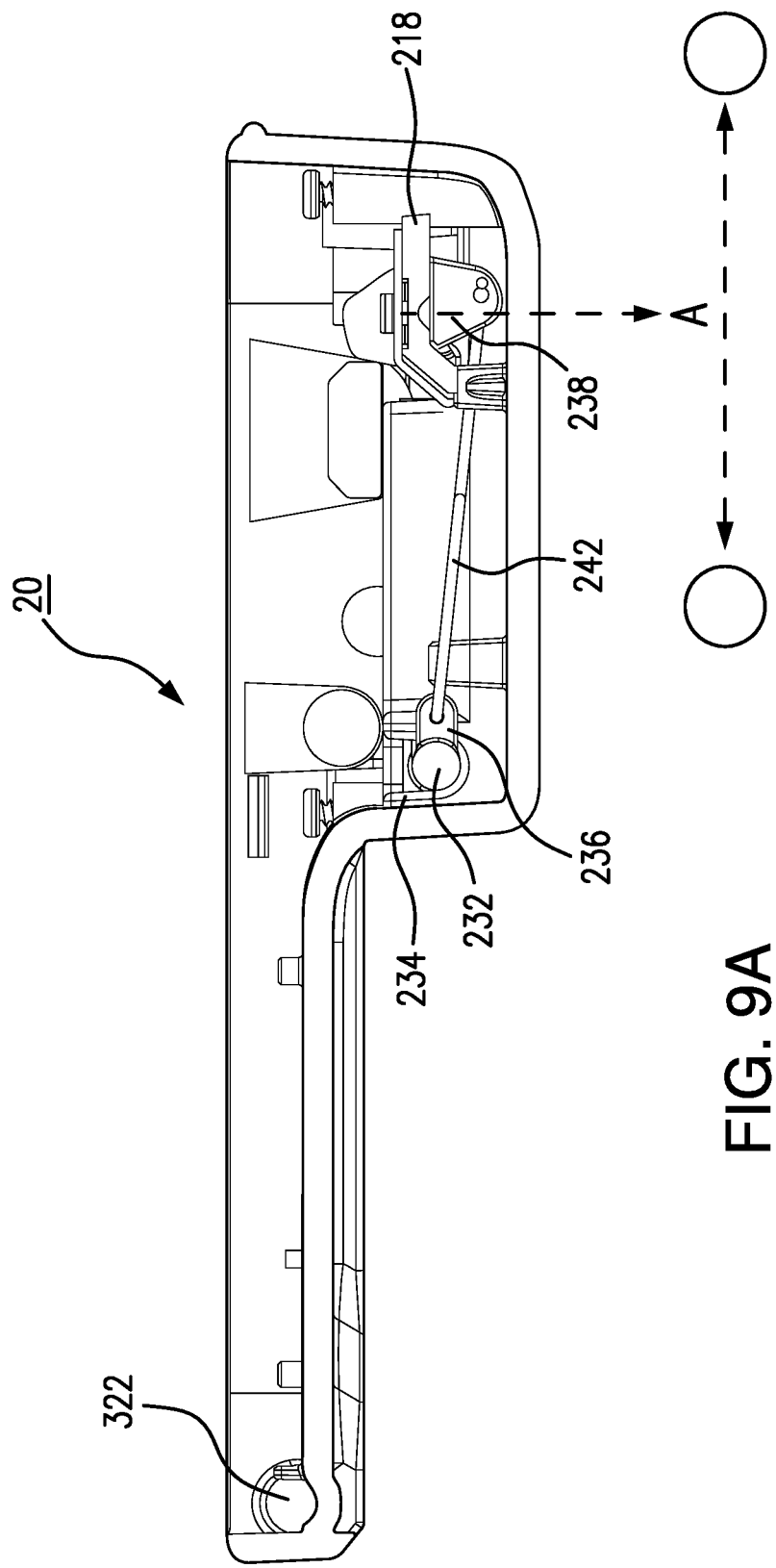
FIG. 9A is a sectional view of the interior of the display housing with the camera device in the closed orientation.
Figure 9B:
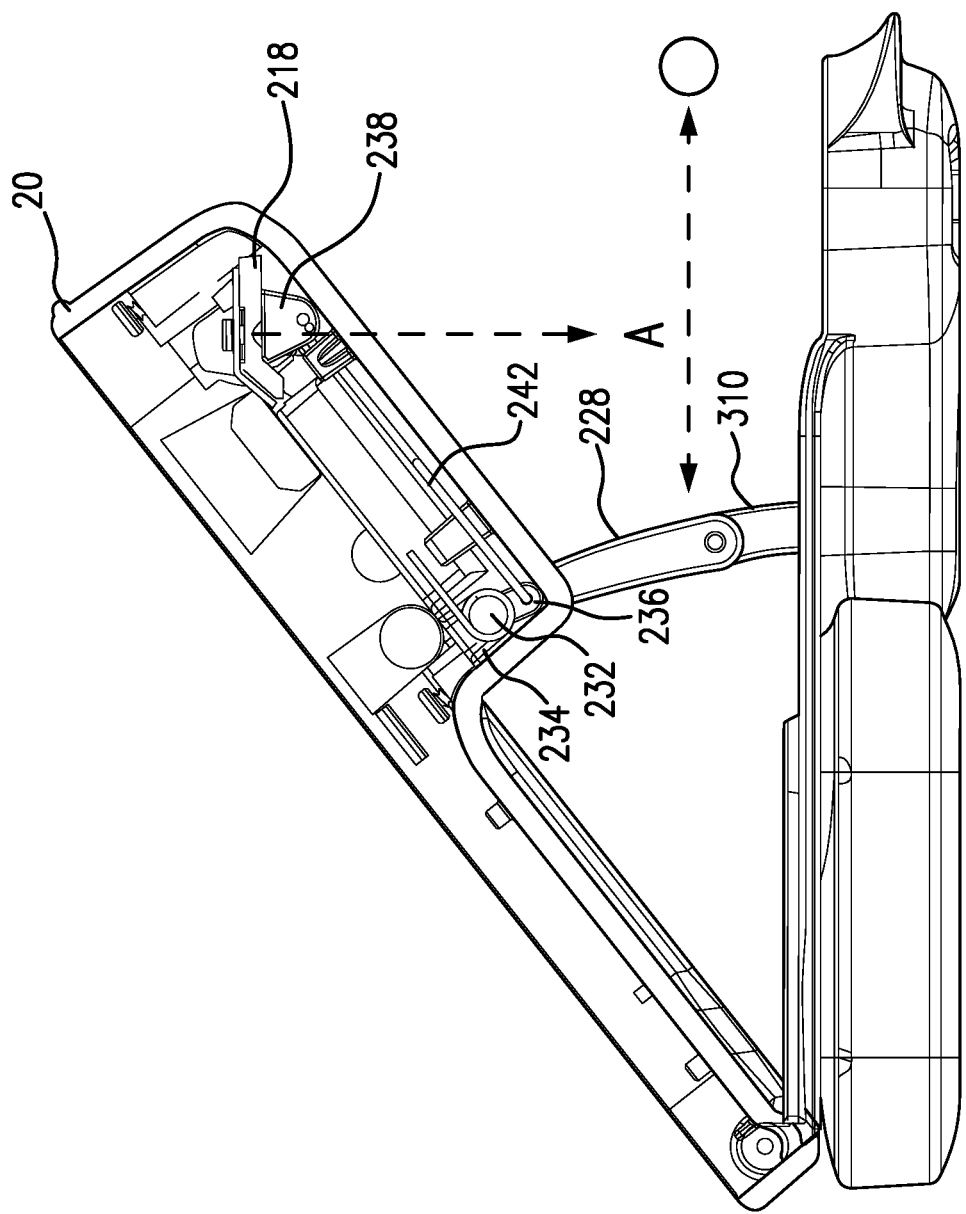
FIG. 9B is a partial sectional view of the interior of the display housing with the camera device in the opened configuration.
Figure 10A:
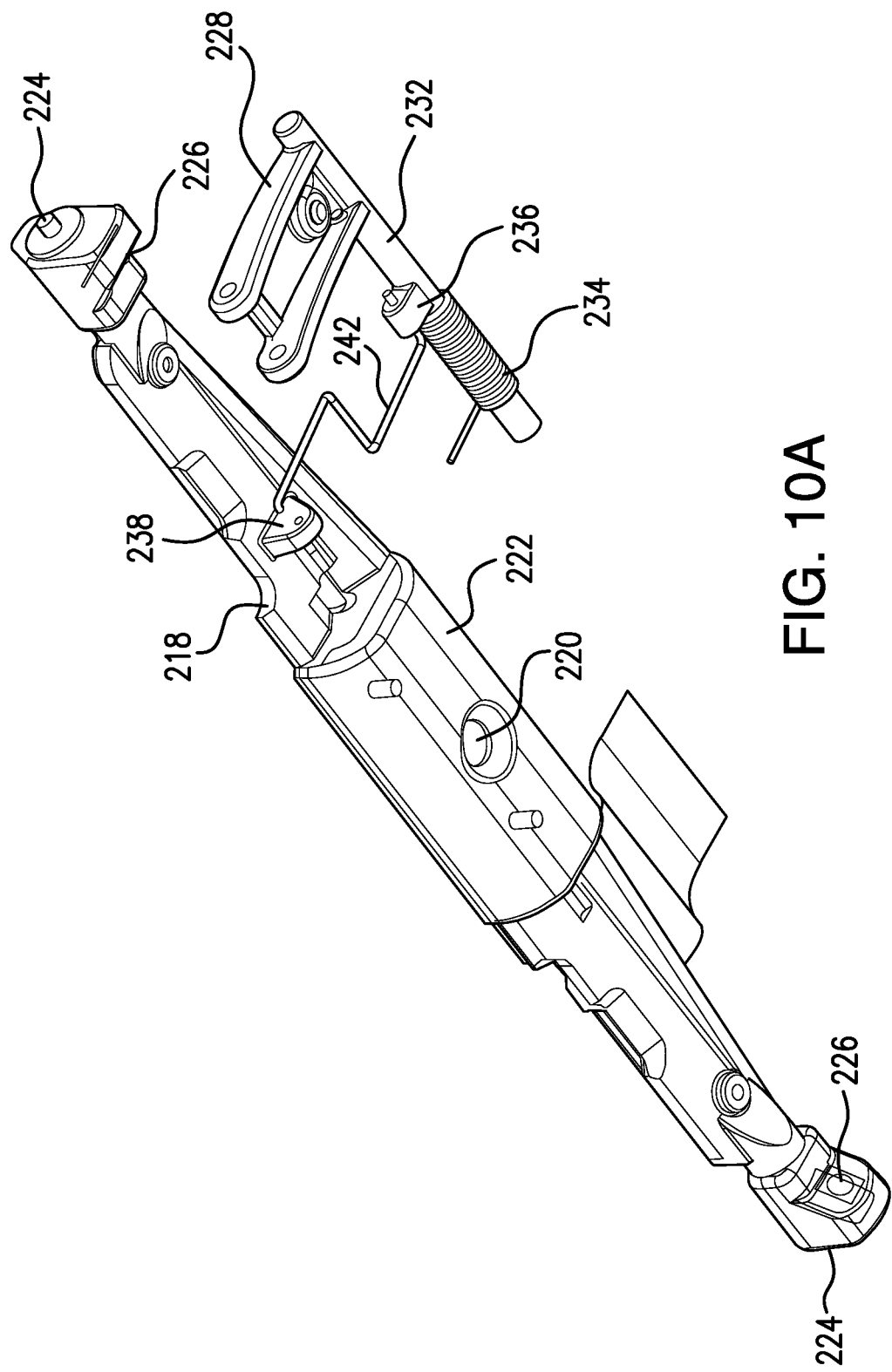
FIG. 10A is detailed view of the camera and lighting assembly with the camera device in the closed configuration.
Figure 10B:
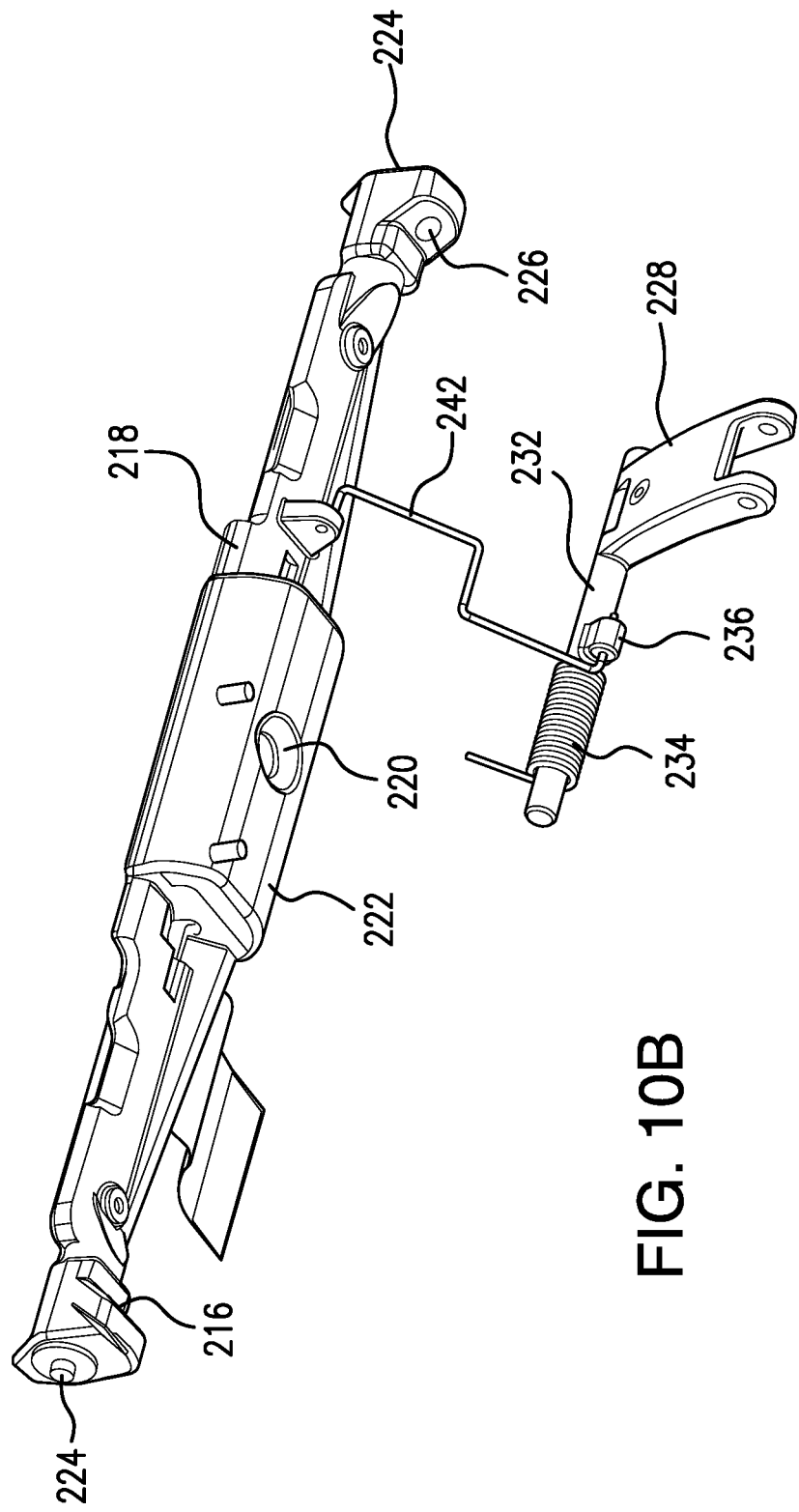
FIG. 10B is a is detailed view of the camera and lighting assembly with the camera device in the opened configuration.

As the upper lever arm 228 rotates into an upright, deployed orientation (corresponding to the pivoted orientation of display housing 20), axle 232 and bell crank 236 are rotated and affect the angular movement of assembly 218. As a result, camera 220 and camera slug 222 are angled with respect to the display housing 20. FIGS. 8A, 9A, and 10A show the mechanism with the display housing closed. FIGS. 8B, 9B, and 10B show the mechanism with the display housing opened. With display housing 20 opened, the axis "A" of camera 220 is angled with respect to the bottom surface of housing 20. This angular orientation is preferred when display housing 20 is pivoted, as it keeps the camera axis "A" perpendicular to the image plane "O". Rotation of assembly 218 also results in lights 226 being pivoted with respect to housing 20. Angling lights 226 is preferred because it allows objects to be illuminated via direct light, and it prevents the shadows associated with indirect lighting. In this manner, the camera 220 sees a well lit and evenly illuminated view of the object.

As the upper lever arm 228 rotates into a horizontal, un-deployed orientation (corresponding to the closed orientation of the display housing 20) axle 232 and bell crank 236 rotate and affect rotation of bell crank 238 along with assembly 218. As a result, camera 220 and camera slug 222 are not angled with respect to display housing 20. This orientation is illustrated in FIGS. 8B, 9B, and 10B. Namely, the axis "A" of camera 220 is perpendicular to the bottom surface of housing 20 and the image plane "O." Rotation of assembly 218 in this manner also results in lights 226 being orientated such that they are perpendicular to the bottom of housing 20. This is also preferred because it keeps the viewed object properly illuminated with direct light.

Finally, wiring is used to connect the flexible circuit associated with assembly 218 to an associated motherboard within housing 20 (not shown). An internal wiring raceway 244 is also included for routing wires from the battery within the handle 40 to the associated motherboard.

Base 30

Base 30 includes a pair of spaced feet 312. A space 314 is created between feet 312 and is used to receive the camera and lighting housing 214 when the display housing 20 is in the closed orientation (note FIG. 2). In this manner, space 314 provides a space for camera 220 to be positioned. When display housing 20 is in the pivoted orientation, objects to be viewed can be positioned within space 314. Each foot 312 includes an opening for directing light from light sources 226. The outer extent of each foot 312 includes a thumb paddle 318. With the device 10 in the closed orientation, a user can grasp the device 10 with two hands and pivot display housing 20 into the opened orientation by engaging paddles 318 with their thumbs. A hinge knuckle 320 is also included on base 30. Hinge knuckle 320 functions as the connection point between base 30 and pivotal handle 40. The back side of base 30 further includes hinges 322 for pivotally connecting base 30 to display housing 20.

Handle 40

Figure 11:
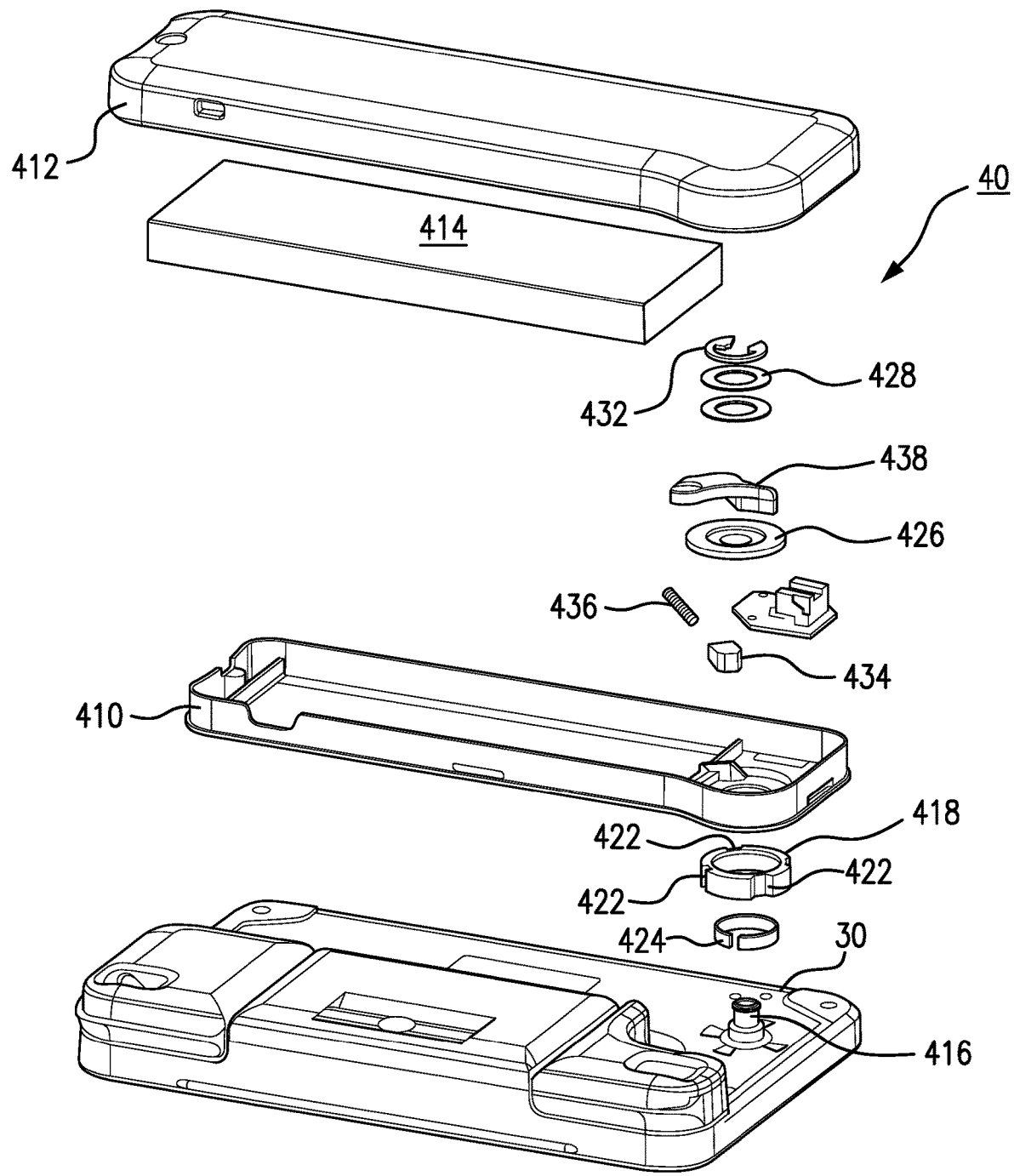
FIG. 11 is an exploded view of the hinge assembly of the handle.
Figure 12:
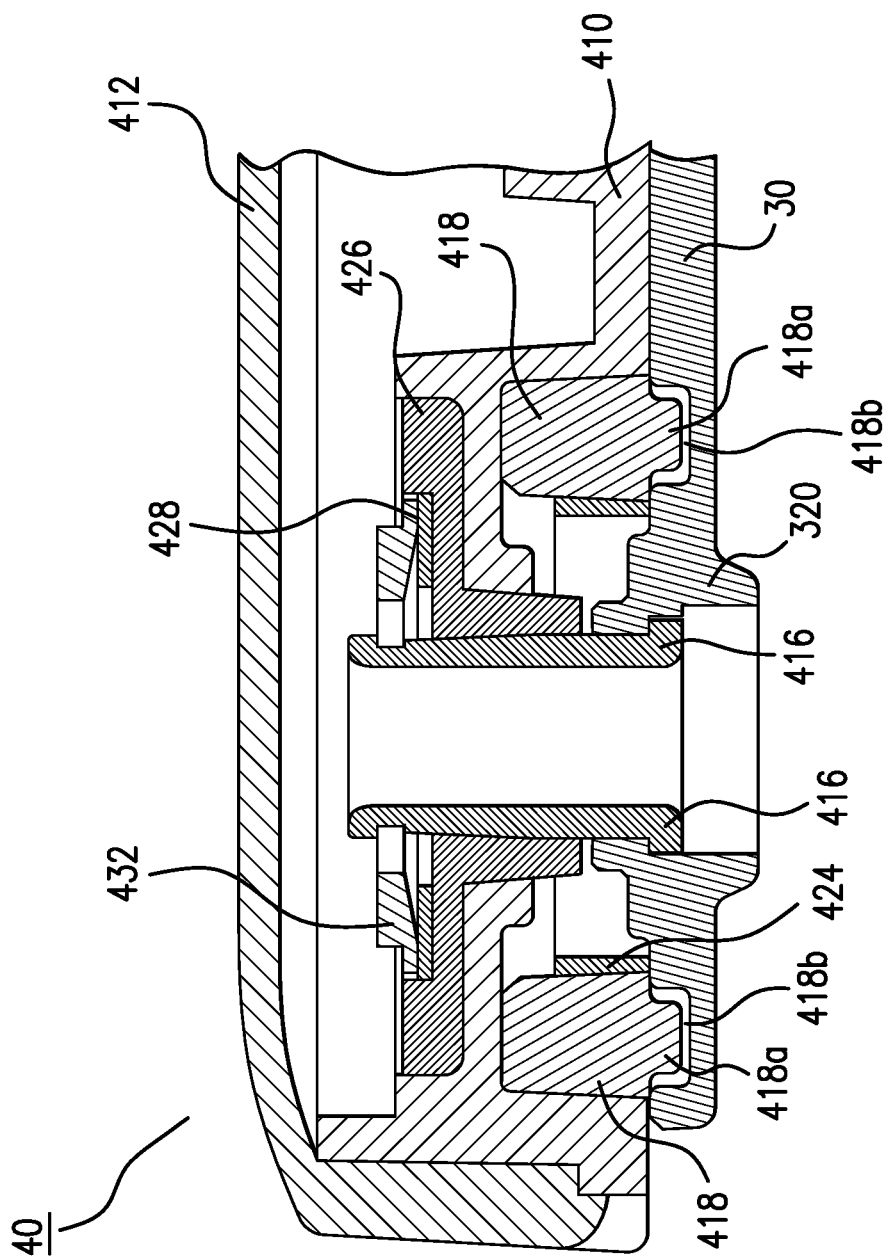
FIG. 12 is a cross sectional view of the hinge assembly of the handle.

Handle 40 and its associated hinge mechanism are described in connection with FIGS. 11 and 12. As illustrated, handle 40 is formed from interconnecting top and bottom portions (410 and 412). Top and bottom portions (410 and 412) form a compartment that house an internal battery pack 414. Wiring from battery pack is routed through handle 40 and through a wiring raceway 244 within display housing 20. Wiring then extends about the internal periphery of housing 20 and along the display housing hinge 322 before being coupled to a motherboard (not shown) positioned within the display housing 20. Handle 40 is designed to pivot relative to base 30. Detents are included such that handle 40 can be secured at various angular positions relative to base 30. In the preferred embodiment, detents permit handle 40 to be secured at 0°, 110°, and 180°. These angular positions are measured between the longitudinal axes of the handle 40 and base 30.

The hinge mechanism employed by handle 40 is described next. In the preferred embodiment, a hinge 416 is press fit into the base 30. A bushing detent 418 is then positioned over top of the hinge 416. A circular recess may be provided on the top portion 410 of handle 40 to accommodate hinge 416 and bushing detent 418. Bushing detent 418 is keyed to the base 30 to secure the bushing detent 418 against rotation. Specifically, busing detent 418 includes lugs 418a that are received within corresponding apertures 418 with base 30. Bushing detent 418 also includes a series of detent apertures 422 within its peripheral outer surface. Detent apertures 422 are positioned to ensure proper positioning of handle 40 at the at 0°, 110°, and 180° positions. The spacing of the detent apertures can be adjusted if other angular positions are preferred.

A ring spring 424 is positioned between the hinge 416 and the bushing detent 418. Ring spring 424 exerts a spring force against the internal surface of bushing detent 418. The purpose of ring spring 424 is to increase the rotational frictional forces acting upon the outer sliding surfaces of the bushing detent 418. Bushing detent 418 is retained by a top bushing 426, an internal washer 428 and one or more retaining rings 432. Washer 428 and retaining rings 432 act to prevent creep and take up tolerance variations. Washer 428 may be a Belleville type washer. One or more of the retaining rings 432 may be a e-type retaining ring. As illustrated in FIG. 11, a plunger 434 is slidably positioned within the upper portion 410 of handle 40 and is adapted to engage the outer peripheral surface of bushing detent 418. A plunger spring 436 engages plunger 434 and urges it into contact with the outer peripheral surface of bushing detent 418. This permits plunger 434 to engage one of the detent apertures 422 of bushing detent 418. By applying sufficient force to handle 40, the force of spring 436 can be overcome to disengage plunger 434 and permit angular movement of handle 40. A retainer 438 may be secured over top of plunger 434 to prevent interference with other internal components. A thumb grip 442 may also be included at a distal end of handle 40 to facilitate its movement.

Thus, device 10 has multiple discrete configurations. In a first configuration, display housing 20 is closed. In this orientation, housing 20 and base 30 are in facing relation and upper and lower lever arms (228 and 310) are pivoted closed. In this orientation, the pivot point interconnecting lever arms (228 and 310) is rotated to the front of device 10. With display housing 20 closed, camera 220 is positioned within opening 314. Furthermore, the camera and lighting positioning mechanism ensures that camera 220 and lights 226 are perpendicular to housing 20 and directly over the image plane. This configuration allows user to hold device 10 and manipulate controls 212 in order to operate camera 220 and view screen 210. Light from sources 226 is delivered through light guides 216 and 314 to directly illuminate the adjacent object.

In the second opened configuration, display housing 20 is pivoted relative to base 30. In this configuration, upper and lower lever arms (228 and 310) are pivoted to a generally upright orientation. The pivoting of upper lever arm 228 results in the camera positioning mechanism automatically adjusting the angular orientation of camera 220 and lights 226. Namely, camera 220 and lights 226 are angled with respect to the lower surface of housing 20 to account for the angular orientation of housing 20. Axis "A" of the camera 220 and lights 226 remains perpendicular to the image plane "O". The object to be viewed can be placed within the space 314 formed between the opposing feet 312 of base 30. In the preferred embodiment, in the opened orientation there is approximately a 38.5° angle between display housing 20 and base 30. This angle allows the user to easily view objects on screen 210 as well as access controls 212.

In both the opened and closed orientations described above, handle 40 is preferably secured in the 0° orientation. Namely, handle 40 is positioned within a recessed area within the back of base 30. This allows handle 40 and base 30 cooperate to form an even lower surface for device 10. In still yet another configuration, handle 40 can be pivoted outwardly relative to the display housing 20 and base 30. Namely, with display housing 20 in its closed orientation, handle 40 can be pivoted to either the 110° or 180° orientation. These configurations allow the user to hold device 10 upright via handle 40. Camera 220 within device 10 can then be pointed at a distant object. Camera control keys 212 are readily accessible to the user in this configuration. Handle 40 can be pivoted back to a position underneath body base 30 (i.e., the 0° orientation) when not needed.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A camera device with multiple configurations comprising:
   a display housing with upper and lower surfaces, a camera positioned within the lower surface, a display screen positioned within the upper surface;
   an upper arm having first and second ends, the first end rotatably connected to the display housing;
   a base interconnected to the display housing by way of a first hinge, the base having forward and rearward ends, opposing sides, and upper and lower surfaces, a pair of feet positioned upon the lower surface, a recess positioned adjacent the feet upon the lower surface, the feet defining an intermediate space for placing objects to be viewed by the camera;
   a lower arm having first and second ends, the first end rotatably connected to the base, a pivot point connecting the second ends of the upper and lower arms, wherein moving the pivot point towards the forward end of the base closes the camera device by placing the display housing and base in facing relation;
   a handle secured to a lower surface of the base by way of a second hinge, the second hinge permitting the handle to be selectively positioned within the recess of the base or outwardly to an opposing side;
   whereby the camera device has a first configuration wherein the camera device is closed and the handle is within the recess, a second configuration wherein the magnifier camera is closed and the handle is pivoted to an opposing side, and a third configuration wherein the display housing is pivoted with respect to the base.

2. The camera device as described in claim 1 further comprising:
   a pivotal camera assembly housing the camera and positioned within the display housing, wherein the upper arm is interconnected to the pivotal camera assembly;
   whereby pivoting the display housing relative to the base results in the rotational movement of the upper arm and the pivotal camera assembly.

3. The camera device as described in claim 2 wherein lighting is included within the pivotal camera assembly.

4. The camera device as described in claim 1 wherein the camera is an image sensor and a heat sink is positioned about the image sensor.

5. The camera device as described in claim 4 wherein the heat sink is formed from aluminum.

6. The camera device as described in claim 1 wherein the axis of rotation of the first hinge is perpendicular to the axis of rotation of the second hinge.

7. The camera device as described in claim 1 wherein the second hinge provides detents at various angular positions of the handle.

8. The camera device has described in claim 1 further comprising a battery pack formed within the handle.

9. A camera device with multiple configurations comprising:
   a display housing with upper and lower surfaces, a camera positioned within the lower surface, a display screen positioned within the upper surface;
   an upper arm having first and second ends, the first end rotatably connected to the display housing;
   a base interconnected to the display housing by way of a first hinge, the base having opposing sides;
   a lower arm having first and second ends, the first end rotatably connected to the base, a pivot point connecting the second ends of the upper and lower arms;
   a handle secured to a lower surface of the base by way of a second hinge, the second hinge permitting the handle to be selectively positioned outwardly to an opposing side of the base;
   the camera device having a first configuration wherein the display housing and base are in facing relation and the handle is aligned with the base, a second configuration wherein the housing and base are in facing relation and the handle is pivoted to an opposing side, and a third configuration wherein the display housing is pivoted with respect to the base.

10. The camera device as described in claim 9 further comprising a pair of feet positioned upon the base, the feet defining an intermediate space for placing objects to be viewed by the camera.

* * * * *